May 11, 1937.  E. W. KELLOGG  2,080,279
FILM FEEDING DEVICE
Filed Sept. 1, 1934
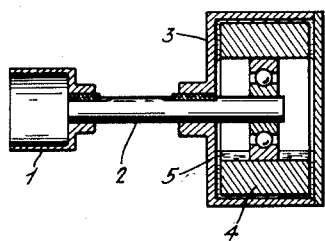
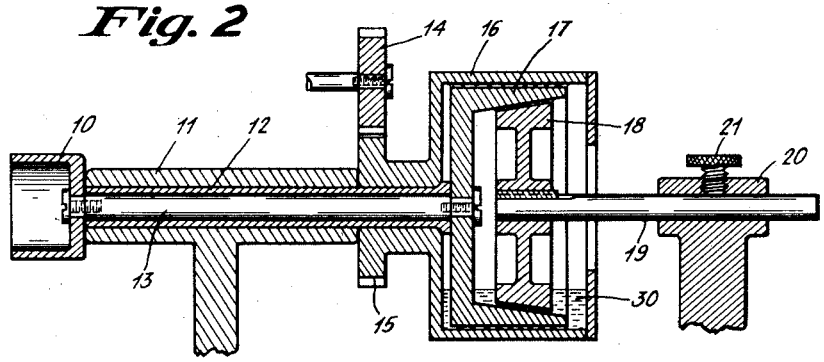
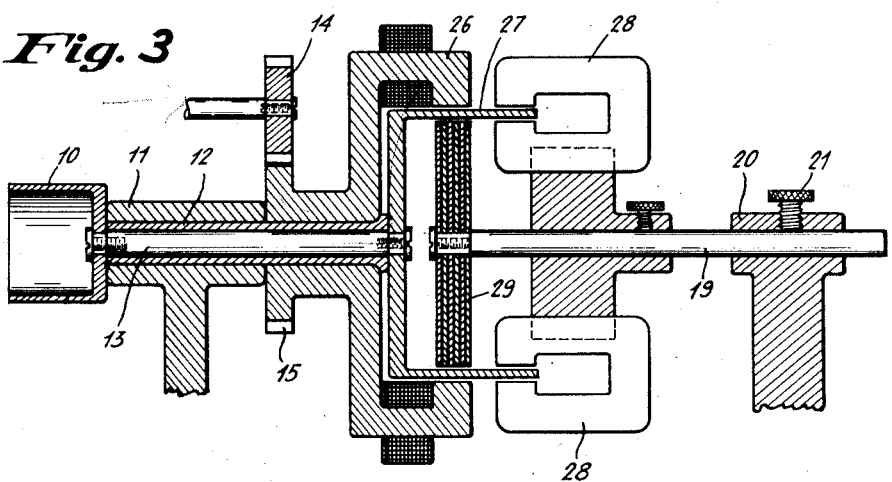
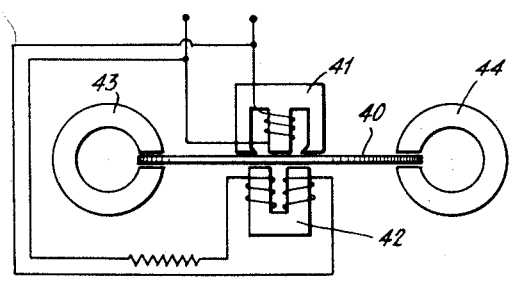
INVENTOR
EDWARD W. KELLOGG
BY
ATTORNEY Patented May 11, 1937

2,080,279

UNITED STATES PATENT OFFICE 2,080,279

FILM FEEDING DEVICE

Edward W. Kellogg, Moorestown, N. J., assignor to Radio Corporation of America, a corporation of Delaware Application September 1, 1934, Serial No. 742,385

7 Claims. (Cl. 271—2.3)

The present invention relates to film feeding means, and more particularly to a mechanism for feeding sound record film through recording or reproducing apparatus and past the recording or reproduction point at a uniform speed.

In my Reissue Patent 19,270, reissued August 14, 1934, and in my Patent 1,969,755 issued August 14, 1934, I have described and claimed apparatus of this general type involving a continuously and aperiodically yieldable coupling between the driving member and the driven member which carries the film, the said reissue patent claiming specifically the form thereof employing a magnetic coupling, and Patent 1,969,755 claiming the form thereof involving a fluid coupling.

The present invention is an improvement on the devices of the said patents, and provides an apparatus having a greater efficacy in smoothing out irregularities in the operation of the driving means.

In carrying out my present invention, I drive the film as in either of the said patents, but I operate the driving member at a speed considerably greater than that of the driven member, and I apply to the driven member a retarding force sufficient to neutralize the excess speed and thereby maintain it at the proper speed. The effectiveness of the aperiodic coupling is increased in the ratio of the speeds of the driving and driven members.

One object of my invention is to provide an improved film driving means which will drive the film at a constant speed.

Another object of my invention is to provide an improved power transmitting means which will transmit power from one rotating member to another without transmitting irregularities in the speed of the driving member.

Another object of my invention is to provide such an improved mechanism in which the speed of the driven member can be controlled independently of the speed of the driving member.

Other and ancillary objects of my invention will be apparent to those skilled in the art from a reading of the following specification and an inspection of the accompanying drawing, in which:

Figure 1 illustrates one form of aperiodic damping device.

Figure 2 is an axial section of the preferred form of my invention.

Figure 3 is an axial section of a second form of my invention, and

Figure 4 is a diagrammatic illustration of a simplified form of my invention.

The device shown in Fig. 1 is covered in my Patent 1,969,755, and is here illustrated in order to more readily explain the principles involved in my present invention. In this device the film drives the drum 1 keyed to the shaft 2, and to which shaft is keyed the container 3. Within this container and rotating freely on the shaft 2 on ball-bearings is a flywheel 4 which is coupled to the casing 3 by oil or other equivalent fluid 5. During normal operation, the flywheel rotates at the same speed as the shaft, but any tendency for the shaft 2 to change speed is opposed by the flywheel with a force determined jointly by the speed difference between the casing and the flywheel and the viscosity of the fluid.

Referring now to the form of my invention shown in Fig. 2:

A film drum 10, similar to drum 1 in Fig. 1, is provided on the shaft 13 which supports and drives the drum at the desired speed or torque. The shaft 13 is carried in a bushing 12 in the bearing 11, and affixed to the other end of the shaft is a coupling member 17 through which power is transmitted to the shaft.

Power is supplied to the apparatus through the gear 14 which meshes with the gear 15 of the casing 16. The casing 16, as shown, is supported on the exterior of the extending portion of the bushing 12.

Within the member 17 is a member 18 adapted to cooperate therewith and the surfaces of these two members are preferably conical in form, as shown, in order to permit adjustment of the coupling therebetween. The member 18 is carried by the shaft 19 which is supported by the bearing 20. This shaft 19 may be either adjusted longitudinally and fixed in place by means of the set-screw 21, or it may be rotated in a direction the same as, or opposite to the direction of rotation of the member 16 by any appropriate form of coupling to the gear 14.

The gear 15 and casing 16 are, as described above, rotated at a speed materially greater than that at which the drum 10 is to be driven, and preferably from two to four or more times the drum speed. The member 16 is coupled to the member 17 by means of oil or other viscous fluid 30 retained within the casing 16. The member 18 is adjusted in relation to the member 17 to which it is similarly coupled by the fluid 30 to produce retarding force sufficient to cause the rotation of the member 17 and the drum 10 at the desired speed.

In this arrangement, the thickness of the film of the coupling fluid between the driving member 16 and the driven member 17 may be materially less than in the device of my Patent 1,969,755 due to the greater relative speeds and the greater slip desired to apply the same torque.

It will be apparent that if a given amount of irregularity is imparted to the drive member 16 by the gear 14 in this device, and if the member 16 is rotating at twice the speed of the member 17, then the proportion of that irregularity transmitted to the film drum 10 will be only one-half of that which would have been transmitted by the device of the said patent if the masses and speeds of the rotating parts are equal.

It will be apparent that the speed ratio may be made almost any amount that may be desired. For example, if the member 16 rotates at ten times the speed of the member 17, and the area and closeness of coupling of the member 18 to the member 17 are correspondingly increased, then the irregularity of motion imparted through this viscous drive will be only one-tenth of that of the said patent. Likewise, if the member 16 is driven in the direction of rotation of the drum 10 at approximately ten times the drum speed and the member 18 driven in the opposite direction at approximately eight times the drum speed, the same resulting speed will be attained for given coupling as by operating the driving member 16 at double speed and holding the retarding member 18 stationary.

In Fig. 3, which shows a modified form of my invention, such parts as are similar to those in Fig. 2 are identified by the same reference numerals. This form of the invention differs from that in Fig. 2 in that a magnetic drive and a magnetic brake are used. The rotating magnet 26, which is constructed in the same general manner as that shown, described, and claimed in my Reissue Patent 19,270 drives the electrically conducting drum 27 by the currents induced therein from the rotating magnetic field. This drum 27 is preferably made of copper, aluminum, or other good conductor. Within the drum and in order to increase the effectiveness of the rotating magnetic field, is located a core member 29 which may be stationary and carried upon the shaft 19.

In place of the member 18 of Fig. 1, I provide a group of stationary magnets 28 which, as shown, are adjustable longitudinally of the shaft 19. It will be apparent that the coupling between the rotating magnet 26 and the member 27 can be varied by varying the current through the windings of the rotating magnetic member, while coupling between the stationary magnets 28 and member 27 can be varied by longitudinal adjustment of the magnets 28 to include more or less of the member 27 within either field.

In Fig. 4, I have shown a much simplified modification of the apparatus of Fig. 3. In this case a non-magnetic and electrically conducting disc 40 is provided which is rotated by the magnets 41, 42 excited by alternating current in the same manner as is customary in phonograph motors, these magnets being so arranged as to tend to drive the disc 40 at a materially higher speed than is necessary.

The stationary magnets 43 and 44, which are preferably permanent magnets, are located adjacent the edges of the disc and may be adjusted radially in position. These magnets 43 and 44 produce eddy currents in the disc 40 when it is rotated therewith between which currents tend to retard the speed of rotation thereof, thereby serving the same function as the adjustable member 18 in Fig. 2. A movement of the magnets 43 and 44 towards the center of the disc will of course decrease the relative speeds of the disc and magnets, and thereby decrease the currents and the drag and increase the rotational speed of the disc and vice versa.

It will be obvious that the disc 40, like the shaft 13 in Figs. 2 and 3, may be connected to any member which it is desired to drive.

Having now described my invention, I claim:

1. Film feeding apparatus comprising a driving means, rotatable film feeding means, means continuously and aperiodically yieldably connecting said driving means and the said film feeding means, a stationary member, and means continuously and aperiodically yieldably connecting the said film feeding means and the said stationary member.

2. Power transmitting apparatus comprising a drive member, a driven member, and a retarding member, and means continuously and aperiodically yieldably connecting the said driven member to both the drive member and the retarding member.

3. Power transmitting apparatus comprising a drive member, a driven member, and a retarding member, and means continuously and aperiodically yieldably connecting the said driven member to both the drive member and the retarding member, the said driving member being driven at a materially higher speed than the said driven member.

4. Power transmitting apparatus comprising a drive member, a driven member and a retarding member, and means continuously and aperiodically yieldably connecting the said driven member to both the drive member and the retarding member, the said driving member being driven at a materially higher speed than the said driven member, and the said retarding member being stationary.

5. Power transmitting apparatus comprising a drive member, a driven member and a retarding member, and means continuously and aperiodically yieldably connecting the said driven member to both the drive member and the retarding member, the said driving member being adapted to drive the driven member at a higher speed than that at which the said driven member will normally run, and the said retarding member being stationary.

6. Power transmitting apparatus comprising a drive member, a driven member and a retarding member, and means continuously and aperiodically yieldably connecting the said driven member to both the drive member and the retarding member, the said driving member being adapted to drive the driven member at a higher speed than that at which the said driven member will normally run, and means for adjusting one of said yieldable connecting means.

7. Power transmitting apparatus comprising a drive member, a driven member and a retarding member, means continuously and aperiodically yieldably connecting the said driven member to both the drive member and the retarding member, the said driving member being driven at a materially higher speed than the said driven member, the said retarding member being stationary, and means for adjusting the coupling between the said retarding member and the said driven member.

EDWARD W. KELLOGG.